(12) United States Patent
Steffens, Jr.

(10) Patent No.: US 6,454,304 B1
(45) Date of Patent: Sep. 24, 2002

(54) APPARATUS FOR SENSING AND RESTRAINING AN OCCUPANT OF A VEHICLE SEAT

(75) Inventor: Charles E. Steffens, Jr., Washington, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/425,851

(22) Filed: Oct. 22, 1999

(51) Int. Cl.$^7$ ................................................ B60R 22/48
(52) U.S. Cl. ..................................... 280/801.1; 280/735
(58) Field of Search .................................. 280/734, 735, 280/801.1, 805; 73/862.391, 862.42, 862.451, 862.471

(56) References Cited

U.S. PATENT DOCUMENTS

| | | | |
|---|---|---|---|
| 3,462,731 A | | 8/1969 | Gray |
| 3,504,336 A | | 3/1970 | Boblitz |
| 3,737,849 A | | 6/1973 | Mead |
| 5,573,269 A | * | 11/1996 | Gentry et al. ............... 280/735 |
| 5,960,523 A | * | 10/1999 | Husby et al. |
| 5,996,421 A | | 12/1999 | Husby |
| 6,081,759 A | | 6/2000 | Husby et al. |
| 6,099,032 A | * | 8/2000 | Cuddihy et al. ............ 280/735 |
| 6,205,868 B1 | * | 3/2001 | Miller .................... 73/862.391 |
| 6,209,915 B1 | * | 4/2001 | Blakesley ................ 280/801.1 |
| 6,230,088 B1 | * | 5/2001 | Husby ..................... 280/801.1 |

* cited by examiner

*Primary Examiner*—Michael Mar
*Assistant Examiner*—Christopher Bottorff
(74) *Attorney, Agent, or Firm*—Tarolli, Sundheim, Covell, Tummino & Szabo L.L.P.

(57) ABSTRACT

An apparatus (10) includes seat belt webbing (12) for restraining an object (14) in a vehicle seat (16). A sensor (50) associated with the vehicle seat (16) senses a sensed weight of the object (14) in the vehicle seat. A seat belt tension sensor (60) senses the tension in the seat belt webbing (12). A controller (44) determines a computed weight of the object (14) as a function of both the sensed weight and the tension in the seat belt webbing (12).

15 Claims, 3 Drawing Sheets

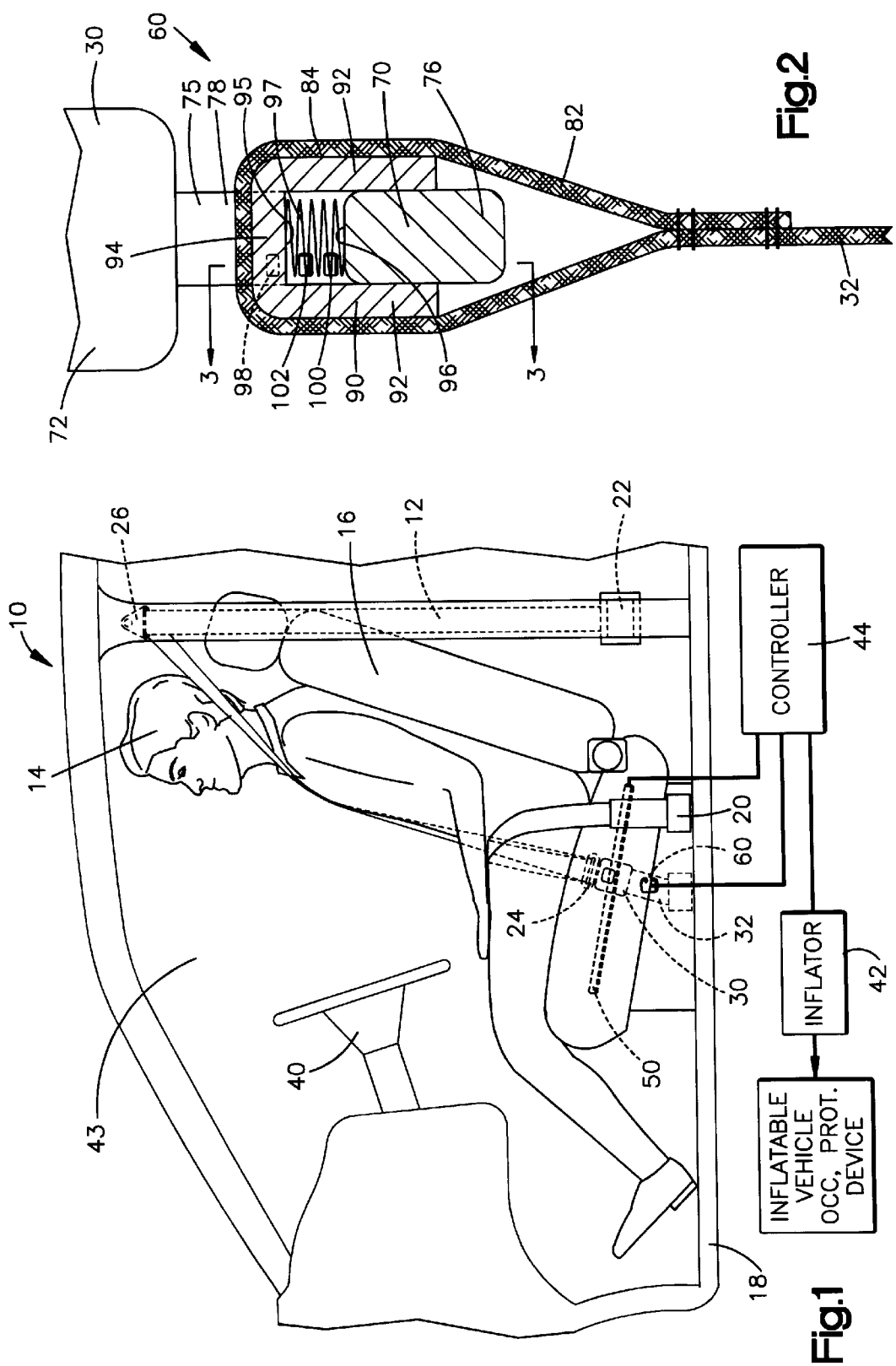

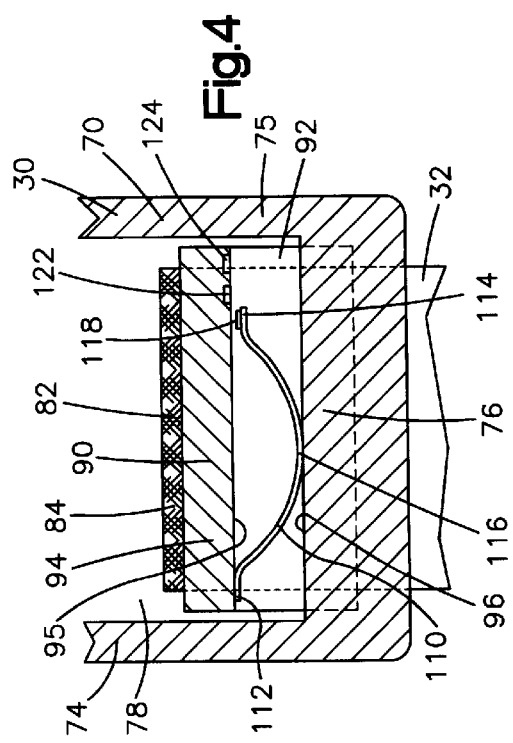
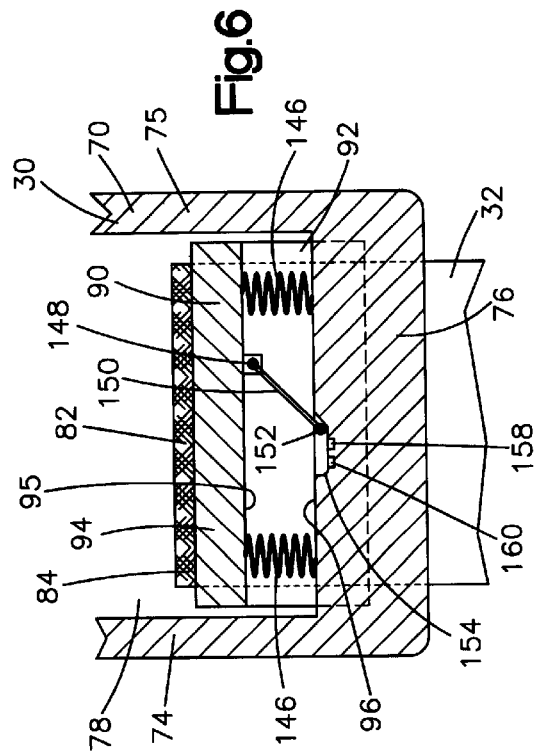
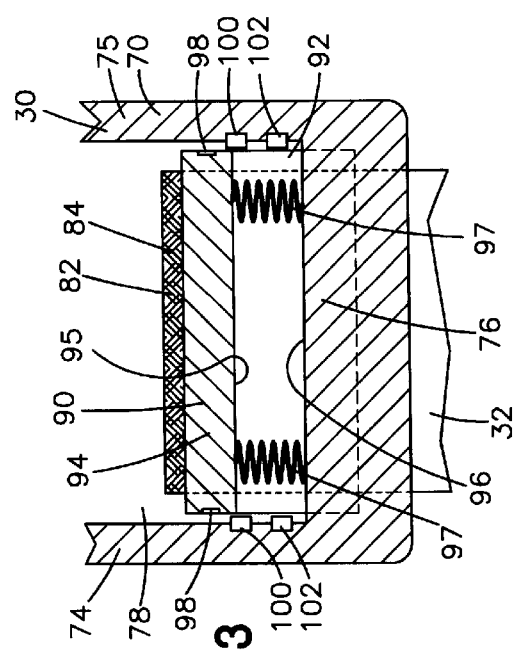
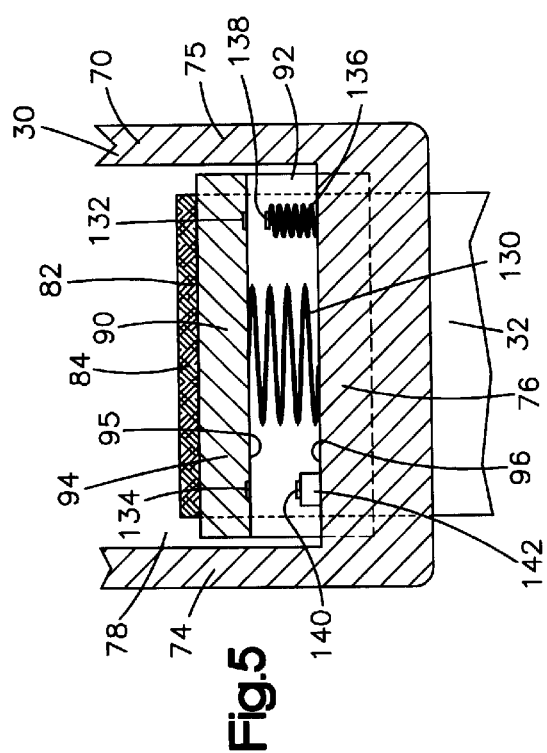

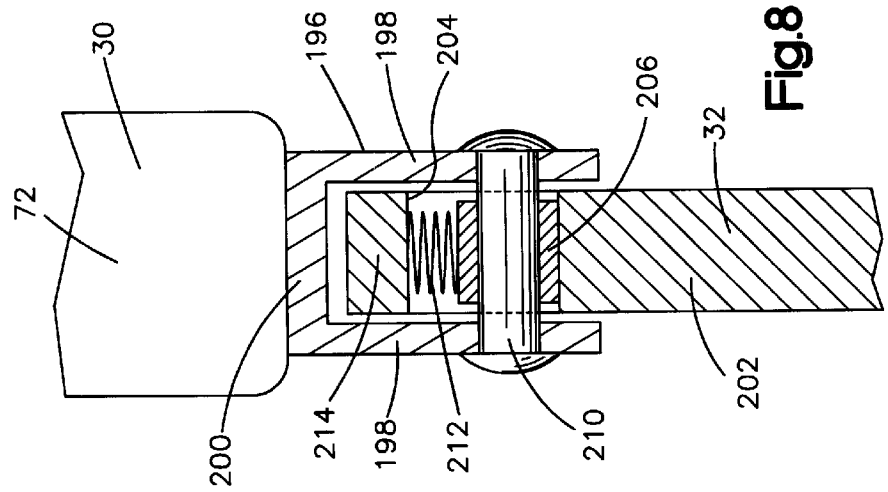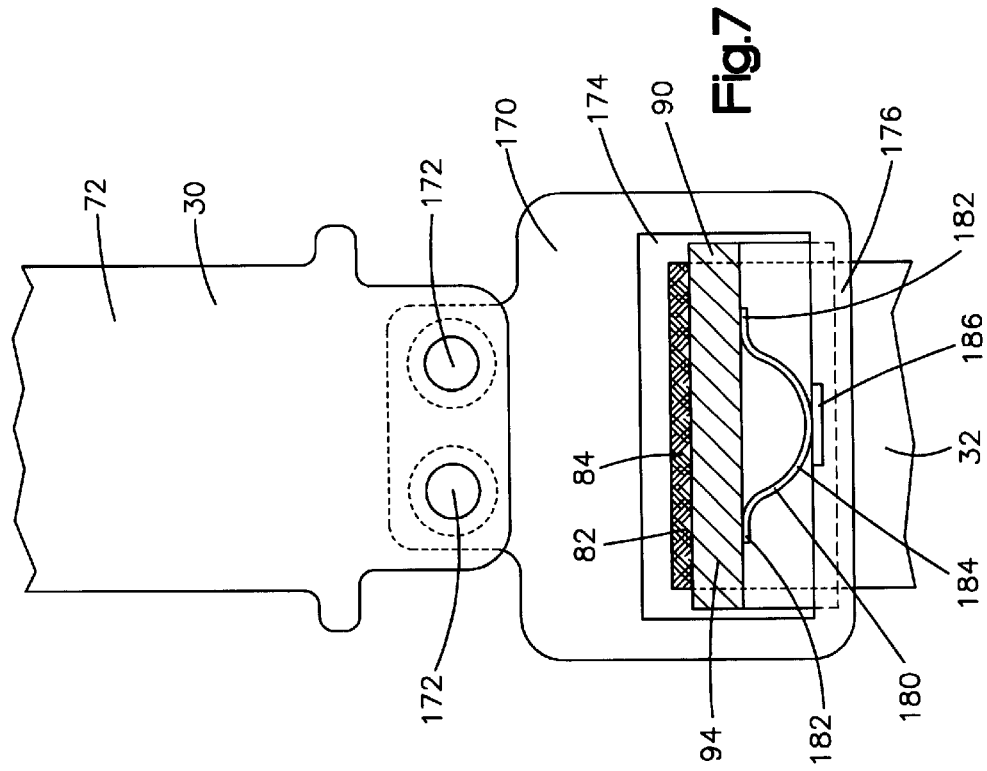

US 6,454,304 B1

APPARATUS FOR SENSING AND RESTRAINING AN OCCUPANT OF A VEHICLE SEAT

FIELD OF THE INVENTION

The present invention relates to an apparatus for sensing the weight of an object in a vehicle seat and for controlling a restraint system in accordance with the weight of the object.

BACKGROUND OF THE INVENTION

An apparatus for restraining an occupant of a vehicle seat typically includes seat belt webbing, a tongue on the webbing, and a seat belt buckle. An occupant weight sensor is mounted in the vehicle seat. The weight sensor provides an output signal which indicates a sensed weight of the occupant of the seat. The apparatus further includes an inflatable vehicle occupant protection device, such as an air bag, a source of inflation fluid for inflating the inflatable occupant protection device, and a controller.

When the vehicle experiences a crash, the source of inflation fluid is actuated by the controller and directs inflation fluid into the inflatable occupant protection device. The controller receives the output signal from the weight sensor in the seat and controls the amount of inflation fluid directed into the inflatable occupant protection device in response to the output signal from the weight sensor. If the weight sensed by the weight sensor is below a predetermined amount, i.e., a low weight in the seat or no occupant in the seat, then the controller disables the source of inflation fluid to prevent inflation of the inflatable occupant protection device. The controller thus controls the fluid pressure in the inflatable protection device and the restraining force provided by the inflatable protection device based on the sensed weight of the occupant. The controller may also disable the inflatable protection device.

SUMMARY OF THE INVENTION

In accordance with the present invention, an apparatus includes seat belt webbing for restraining an object, such as a vehicle occupant, in a vehicle seat. A sensor associated with the vehicle seat senses a sensed weight of the object in the vehicle seat. The sensed weight may differ from the actual weight of the object. A seat belt tension sensor senses the tension in the seat belt webbing. A controller determines a computed weight of the object as a function of both the sensed weight and the tension in the seat belt webbing.

BRIEF DESCRIPTION OF THE DRAWINGS

The foregoing and other features of the present invention will become apparent to one skilled in the art to which the present invention relate s upon consideration of the following description of the invention with reference to the accompanying drawings, in which:

FIG. 1 is a schematic view of a restraint system in accordance with the present invention;

FIG. 2 is a schematic sectional view of a seat belt buckle and anchor of the restraint system of FIG. 1 showing a first embodiment of a seat belt tension sensor;

FIG. 3 is a view taken along the line 3—3 of FIG. 2;

FIG. 4 is a schematic sectional view of a second embodiment of a seat belt tension sensor;

FIG. 5 is a schematic sectional view of a third embodiment of a seat belt tension sensor;

FIG. 6 is a schematic sectional view of a fourth embodiment of a seat belt tension sensor;

FIG. 7 is a schematic sectional view of a fifth embodiment of a seat belt tension sensor; and FIG. 8 is a schematic sectional view of a sixth embodiment of a seat belt tension sensor.

DESCRIPTION OF THE PREFERRED EMBODIMENTS

The present invention relates to a restraint system. As illustrative of the present invention, a restraint system 10 (FIG. 1) includes seat belt webbing 12 for restraining an object, such as a vehicle occupant 14, in a vehicle seat 16. It is to be understood that the present invention could be used in an occupant restraint system for restraining an occupant or object, such as a child safety seat, in a passenger seat. A length of the seat belt webbing 12 is extensible about the vehicle occupant 14. One end of the seat belt 12 is anchored to the vehicle body 18 at an anchor point 20 located on one side of the seat 16. The opposite end of the seat belt 12 is attached to a retractor 22 which is usually secured to the vehicle body 18 on the same side of the seat 16 as the anchor point 20.

As shown in FIG. 1, typically, intermediate its ends, the seat belt 12 passes through a tongue assembly 24 and a D-ring 26 that is located above the retractor 22 and the anchor point 20. When the seat belt webbing 12 is not in use, the seat belt is wound on the retractor 22, as known in the art. To use the seat belt webbing 12, the tongue assembly 24 is connected with a buckle 30. The buckle 30 is connected to the vehicle body 18 by an anchor 32.

An inflatable vehicle occupant protection device, such as an air bag (not shown), is stored in a folded condition in a portion of the vehicle, such as a steering wheel 40 or in a dashboard of the vehicle. When the vehicle experiences a crash in which it is desirable to inflate the air bag, an inflator 42 is actuated and provides inflation fluid for inflating the inflatable occupant protection device. The inflation fluid may be generated by combustion of pyrotechnic material or simply released from a pressurized container, as known in the art. The inflation fluid directed into the air bag inflates the air bag from the folded condition to an inflated condition in which the air bag extends into an occupant compartment 43. The air bag then helps protect the occupant 14 from a forceful impact with parts of the vehicle.

An electronic controller 44, such as a microcomputer, is operatively connected to a vehicle crash sensor (not shown). The crash sensor may be any of several known types. Once the controller 44 determines that a crash is occurring for which inflation of the inflatable occupant protection device is necessary to help protect the occupant 14 of the seat 16, the controller actuates the inflator 42.

The amount of inflation fluid directed into the air bag is controlled so that the air bag provides a restraining force that is related to the weight of the occupant 14 of the seat 16. A sensor 50 is mounted on the seat 16. The sensor 50 senses a sensed weight of the occupant 14 of the vehicle seat 16. The sensed weight may differ from the actual weight of the occupant 14.

During operation of the vehicle, the occupant 14 usually has the tongue 24 connected with the buckle 30. The retractor 22 produces a tension on the seat belt webbing 12 which acts on the occupant 14. The tension in the seat belt webbing 12 pulls down on the occupant 14 causing the sensor 50 to be subjected to the weight of the occupant 14 along with the downward force resulting from the tension in the seat belt 12. The output signal from the sensor 50 thus indicates a sensed weight of the occupant 14 which may be greater than the actual weight of the occupant.

A seat belt tension sensor 60 senses the tension in the seat belt webbing 12 and provides an output signal indicating the tension in the seat belt. The output signals from the sensor 50 and the tension sensor 60 are received by the controller 44. The controller 44 determines a computed weight of the occupant 14 as a function of both the sensed weight and the tension in the seat belt 12. The sensed weight differs from the actual weight of the occupant 14 by a first amount. The computed weight differs from the actual weight of the occupant 14 by a second amount that is less than the first amount and may be zero.

The controller 44 controls the amount of inflation fluid directed to the air bag by the inflator 42 based on the computed weight of the object or occupant in the seat 16. If the computed weight is below a predetermined value or zero, the controller 44 disables the inflator 42 to prevent inflation fluid from being directed to the air bag. Alternatively, if the computed weight is below the predetermined value, the controller 44 causes the inflator to direct a minimal amount of inflation fluid to the inflatable occupant protection device.

The controller 44 may have a look-up table that stores a plurality of empirical sensed weight values, a plurality of empirical seat belt tension values, and a plurality of computed weight values corresponding to combinations of the sensed weight values and the seat belt tension values. The computed weight values stored in the look-up table could be predetermined empirically and/or through computations based on a predetermined functional relationship between computed weight and the empirical values of sensed weight and seat belt tension. The controller 44 would then identify a predetermined computed weight value corresponding to empirical values of sensed weight and seat belt tension. Alternatively, the controller 44 could determine the computed weight by performing a computation based on a predetermined functional relationship between computed weight, sensed weight, and belt tension which is derived from empirical data. In either case, the computed weight determined by the controller 44 more closely approximates the actual weight of the occupant 14, as compared with the sensed weight indicated by the sensor 50 because the effect of the tension in the seat belt 12 is considered in determining the computed weight.

If the present invention is used in a restraint system for restraining an object in a passenger seat, the sensor 50 may also sense the size and shape of the object in the seat to determine if a child safety seat is located in the passenger seat. If a child safety seat is located in the passenger seat, the tongue is connected with the buckle to secure the child safety seat to the passenger seat. Typically, the seat belt webbing is pulled as tight as possible to secure the child safety seat to the passenger seat. The tension in the seat belt webbing pulls down on the child safety seat causing the sensor 50 to be subjected to the weight of the child safety seat with the child therein and the downward force resulting from the tension in the seat belt. The output signal from the sensor 50 thus indicates a sensed weight of the child safety seat and the child therein which is greater than the actual weight of the child safety seat and the child.

The seat belt tension sensor 60 senses the tension in the seat belt webbing. The controller 44 determines a computed weight of the child safety seat and the child therein. If the sensor 50 senses that a child safety seat is located in the passenger seat, the controller 44 disables the source of inflation fluid to prevent inflation of the inflatable occupant protection device. Alternatively, if the sensor 50 senses that a child safety seat is located in the passenger seat, the controller 44 causes the source of inflation fluid to direct a minimal amount of inflation fluid to the inflatable occupant protection device.

A first embodiment of a seat belt tension sensor 60 for use in the occupant restraint system 10 is shown in FIGS. 2 and 3. The buckle 30 includes a U-shaped extension 70 (FIG. 3) extending from a buckle frame 72 (FIG. 2). The U-shaped extension 70 includes a pair of parallel arms 74 and 75 (FIG. 3) extending from the buckle frame 72. A cross piece 76 extends between the arms 74 and 75 and perpendicular to the arms. The buckle frame 72 and the U-shape extension 70 define an opening 78.

The anchor 32 (FIG. 2) includes webbing 82 extending through the opening 78. The webbing 82 is attached to itself to define a loop 84. The loop 84 extends around a U-shaped floating member 90 to connect the anchor 32 with the floating member. Accordingly, the floating member 90 is fixed relative to the anchor 32 and the vehicle body 18.

The floating member 90 includes a pair of parallel arms 92 (FIG. 2). A cross piece 94 extends between the arms 92 and perpendicular to the arms. The cross piece 94 has a lower surface 95 that extends parallel to an upper surface 96 of the cross piece 76 of the extension 70. The arms 92 of the floating member 90 engage the cross piece 76 of the extension 70 to guide movement of the extension and the buckle 30 relative to the floating member 90 and the anchor 32.

Springs 97 (FIG. 3) extend between the surface 96 of the cross piece 76 and the surface 95 of the cross piece 94. The springs 97 allow the buckle 30 to move upward, as viewed in FIGS. 2 and 3, relative to the floating member 90 and the anchor 32. The springs 97 bias the buckle 30 in a downward direction relative to the anchor 32 and the floating member 90 to an initial position, as shown in FIGS. 2 and 3. Movement of the buckle 30 relative to the floating member 90 and the anchor 32 results from a force proportional to the tension in the seat belt 12.

Electrical contacts 98 (FIG. 3) are connected to the cross piece 94 of the floating member 90 adjacent to the arms 74 and 75. Electrical contacts 100 are connected to the arms 74 and 75 of the extension 70. The electrical contacts 98 and 100 act as a switch in a first electrical circuit (not shown). When the contacts 98 and 100 are spaced apart, the switch is open. When the contacts 98 and 100 engage, the switch is closed and the first electrical circuit is completed.

The electrical contacts 100 are spaced from the contacts 98 a first distance, shown in FIG. 3, when the buckle 30 is in the initial position. The electrical contacts 100 engage the electrical contacts 98 when the buckle 30 moves through the first distance upward relative to the anchor 32. When the electrical contacts 100 engage the electrical contacts 98, the first electrical circuit is completed to send a first signal to the controller that a first predetermined amount of tension is being applied to the seat belt 12.

Electrical contacts 102 are connected to the arms 74 and 75 at a location spaced below the electrical contacts 100, as viewed in FIG. 3. The electrical contacts 98 and 102 act as a switch in a second electrical circuit (not shown). When the contacts 98 and 100 are spaced apart, the switch is open. When the contacts 98 and 102 engage, the switch is closed and the second electrical circuit is completed.

The electrical contacts 102 are spaced from the contacts 98 a second distance greater than the first distance when the buckle 30 is in the initial position. The electrical contacts 102 engage the electrical contacts 98 when the buckle 30 moves through the second distance relative to the anchor 32. When the electrical contacts 102 engage the contacts 98, the second electrical circuit is completed to send a second signal to the controller that a second predetermined amount of tension, larger than the first predetermined amount, is being applied to the seat belt 12.

When the tongue 24 is inserted into the buckle 30, tension is applied to the seat belt webbing 12. The belt buckle 30 moves upward relative to the anchor 32 and the floating member 90, as viewed in FIGS. 2 and 3. If the amount of tension being applied to the seat belt 12 is less than the first predetermined amount, the buckle 30 moves upward relative to the floating member 90 a distance less than the first distance so that the contacts 100 remain below the contacts 98. A signal indicating that little or no tension is being applied to the webbing 12 is sent to the controller 44.

If the amount of tension in the webbing 12 is equal to or greater than the first predetermined amount and less than the second predetermined amount, the buckle 30 moves upward relative to the floating member 90 a distance equal to or greater than the first distance and less than the second distance. The contacts 98 engage the contacts 100 when the buckle 30 has moved relative to the floating member 90 through the first distance. The first electrical circuit is completed when the contacts 98 engage the contacts 100, and a signal indicating that the first predetermined amount of tension is being applied to the seat belt 12 is sent to the controller 44.

If the amount of tension in the webbing 12 is equal to or greater than the second predetermined amount, the buckle 30 moves upward relative to the floating member 90 a distance equal to or greater than the second distance. The contacts 98 engage the contacts 102 when the buckle 30 has moved relative to the floating member 90 through the second distance. The second electrical circuit is completed when the contacts 98 engage the contacts 102 and a signal indicating that the second predetermined amount of tension is being applied to the seat belt 12 is sent to the controller 44. Accordingly, a signal is sent to the controller 44 in a step manner.

A second embodiment of a seat belt tension sensor for use in the occupant restraint system 10 of FIG. 1 is illustrated in FIG. 4. Since the embodiment of the seat belt tension sensor illustrated in FIG. 4 is generally similar to the embodiment of the seat belt tension sensor illustrated in FIGS. 2–3, similar numerals will be utilized to designate similar components.

A leaf spring 110 has end portions 112 and 114 and a curved portion 116 extending between the end portions. The end portion 112 is fixedly connected to a cross piece 94 of a floating member 90. The end portion 112 is connected to the cross piece 94 adjacent an arm 74 of extension 70 of the buckle 30. The curved portion 116 engages a surface 96 of a cross piece 76 of the extension 70. The spring 110 biases the buckle 30 downward relative to the floating member 90 and anchor 32 into an initial position, as shown in FIG. 4.

An electrical contact 118 is connected to end portion 114 of the spring 110. As the buckle 30 moves relative to the floating member 90, the spring 110 flattens out and the end portion 114 moves to the right, as viewed in FIG. 4, along the surface 95 of the cross piece 94.

An electrical contact 122 is connected to the cross piece 94 of the floating member 90. The contacts 118 and 122 act as a switch in a first electrical circuit (not shown). When the contacts 118 and 122 are spaced apart, the switch is open. When the contacts 118 and 122 engage, the switch is closed and the first electrical circuit is completed.

The electrical contact 122 is spaced to the right of the contact 118 when the buckle 30 is in the initial position. The electrical contact 118 on the spring 110 engages the electrical contact 122 when the buckle 30 moves relative to the anchor 32 through a first distance. When the electric contact 118 engages the contact 122, the first electrical circuit is completed to send a first signal to the controller 44 that a first predetermined amount of tension is being applied to the seat belt 12.

An electrical contact 124 is connected to the cross piece 94 spaced to the right of the contact 122. The contacts 118 and 124 act as a switch in a second electrical circuit (not shown). When the contacts 118 and 124 are spaced apart, the switch is open. When the contacts 118 and 124 engage, the switch is closed and the second electrical circuit is completed.

The electrical contact 118 engages the contact 124 when the buckle 30 moves through a second distance greater than the first distance relative to the anchor 32. When the electrical contact 118 engages the contact 124, the second electrical circuit is completed to send a second signal to the controller 44 that a second predetermined amount of tension is being applied to the seat belt 12.

When the tongue 24 is inserted into the buckle 30, tension is applied to the seat belt webbing 12. The buckle 30 moves upward relative to the anchor 32 and the floating member 90, as viewed in FIG. 4. If the amount of tension being applied to the seat belt 12 is less than the first predetermined amount, the buckle 30 moves upward relative to the floating member 90 a distance less than the first distance. The contact 118 does not engage the contact 122. A signal indicating that little or no tension is being applied to the seat belt 12 is sent to the controller 44.

If the amount of tension in the seat belt 12 is equal to or greater than the first predetermined amount and less than the second predetermined amount, the buckle 30 moves upward relative to the floating member 90 a distance equal to or greater than the first distance and less than the second distance. The contact 118 engages the contact 122 when the buckle 30 has moved relative to the floating member 90 through the first distance. The first electrical circuit is completed when the contact 118 engages the contact 122 and a signal indicating that the first predetermined amount of tension is being applied to the seat belt 12 is sent to the controller 44.

If the amount of tension in the seat belt 12 is equal to or greater than the second predetermined amount, the buckle 30 moves upward relative to the floating member 90 a distance equal to or greater than the second distance. The contact 118 engages the contact 124 when the buckle 30 has moved relative to the floating member 90 through the second distance. The second electrical circuit is completed when the contact 118 engages the contact 124, and a signal indicating that the second predetermined amount of tension is being applied to the seat belt 12 is sent to the controller 44. Accordingly, a signal is sent to the controller 44 in a step manner. Alternatively, an inductive sensor could be used instead of the contacts 118, 122, and 124.

A third embodiment of a seat belt tension sensor for use in the occupant restraint system 10 of FIG. 1 is illustrated in FIG. 5. Since the embodiment of the seat belt tension sensor illustrated in FIG. 5 is generally similar to the embodiment of the seat belt tension sensor illustrated in FIGS. 2-3, similar numerals will be utilized to designate similar components.

A coil spring 130 extends between a surface 95 of a floating member 90 and a surface 96 of an extension 70 of a buckle 30. The spring 130 biases the seat belt buckle 30 downward relative to the floating member 90 and the anchor 32 to an initial position, as shown in FIG. 5.

An electrical contact 132 is connected to a cross piece 94 of the floating member 90 adjacent an arm 75 of the extension 70. An electrical contact 134 is connected to the cross piece 94 adjacent an arm 74 of the extension 70.

A spring 136 extends from a cross piece 76 of the extension 70 toward the electrical contact 132 on the floating member 90. The spring 136 is weaker than the spring 130. An electrical contact 138 is connected to an end of the spring 136. The contacts 122 and 138 act as a switch in a first electrical circuit (not shown). When the contacts 132 and 138 are spaced apart, the switch is open. When the contacts 132 and 138 engage, the switch is closed and the first electrical circuit is completed.

The contact 138 is spaced from the contact 132 a first distance when the buckle 30 is in the initial position. The electrical contact 138 engages the electrical contact 132 when the buckle 30 moves relative to the anchor 32 through the first distance. When the contact 138 engages the contact 132, the first electrical circuit is completed to send a signal to the controller 44 that a first predetermined amount of tension is being applied to the seat belt 12.

An electrical contact 140 is connected to a protrusion 142 extending from the cross piece 76. The protrusion 142 extends toward the electrical contact 134 on the floating member 90. The contacts 134 and 140 act as a switch in a second electrical circuit (not shown). When the contacts 134 and 140 are spaced apart, the switch is open. When the contacts 134 and 140 engage, the switch is closed and the second electrical circuit is completed.

The contact 140 is spaced from the contact 134 a second distance larger than the first distance when the buckle 30 is in the initial position. The electrical contact 140 on the protrusion 142 engages the electrical contact 134 when the buckle 30 moves relative to the anchor 32 through the second distance. When the contact 140 engages the contact 134, the second electrical circuit is completed to send a signal to the controller 44 that a second predetermined amount of tension is being applied to the seat belt 12.

When the tongue 24 is inserted into the buckle 30, tension is applied to the seat belt webbing 12. The buckle 30 moves upward relative to the anchor 32 and the floating member 90, as viewed in FIG. 5. If the amount of tension being applied to the seat belt 12 is less than the first predetermined amount, the buckle 30 moves upward relative to the floating member 90 a distance less than the first distance. The contact 138 does not engage the contact 132. A signal indicating that little or no tension is being applied to the seat belt 12 is sent to the controller 44.

If the amount of tension in the seat belt 12 is equal to or greater than the first predetermined amount and less than the second predetermined amount, the buckle 30 moves upward relative to the floating member 90 a distance equal to or greater than the first distance and less than the second distance. The contact 138 engages the contact 132 when the buckle 30 has moved relative to the floating member 90 through the first distance. The first electrical circuit is completed when the contact 138 engages the contact 132, and a signal indicating that the first predetermined amount of tension is being applied to the seat belt 12 is sent to the controller 44.

If the amount of tension in the seat belt 12 is equal to or greater than the second predetermined amount, the buckle 30 moves upward relative to the floating member 90 a distance equal to the second distance. The contact 140 engages the contact 134 when the buckle 30 moves relative to the floating member 90 through the second distance. The second electrical circuit is completed when the contact 140 engages the contact 134, and a signal indicating that the second predetermined amount of tension is being applied to the seat belt 12 is sent to the controller 44. Accordingly, a signal is sent to the controller 44 in a step manner.

A fourth embodiment of a seat belt tension sensor for use in the occupant restraint system 10 of FIG. 1 is illustrated in FIG. 6. Since the embodiment of the seat belt tension sensor illustrated in FIG. 6 is generally similar to the embodiment of the seat belt tension sensor illustrated in FIGS. 2–3, similar numerals will be utilized to designate similar components.

Springs 146 extend between a surface 96 of an extension 70 of a buckle 30 and a surface 95 of a floating member 90. The springs 146 bias the seat belt buckle 30 in a downward direction relative to the floating member 90 and an anchor 32 into an initial position, as shown in FIG. 6.

An end 148 of an electrically conductive arm 150 is pivotally connected to a cross piece 94 of the floating member 90. An opposite end 152 of the arm 150 is located in a slot 154 in a cross piece 76 of the extension 70. The arm 150 is pivotable about the end 152 relative to the cross piece 76. The end 152 slides in the slot 154 as the buckle 30 moves relative to the anchor 32.

An electrical contact 158 is located in a middle portion of the slot 154. The end 152 of the arm 150 and the contact 158 act as a switch in a first electrical circuit (not shown). When the end 152 and the contact 158 are spaced apart, the switch is open. When the end 152 and the contact 158 engage, the switch is closed and the first electrical circuit is completed.

The contact 158 is spaced to the left of the end 152 of the arm 150 when the buckle 30 is in the initial position. The end 152 of the arm 150 engages the contact 158 when the buckle 30 moves relative to the anchor 32 through a first distance. When the end 152 engages the contact 158, the first electrical circuit is completed to send a signal to the controller 44 that a first predetermined amount of tension is being applied to the seat belt 12.

An electrical contact 160 is located adjacent one end of the slot 154 and to the left of the contact 158.

The end 152 of the arm 150 and the contact 160 act as a switch is a second electrical circuit (not shown). When the end 152 and the contact 160 are spaced apart, the switch is open. When the end 152 and the contact 160 engage, the switch is closed and the second electrical circuit is completed.

The end 152 engages the contact 160 to complete a second electrical circuit when the buckle 30 moves a second distance, greater than the first distance, relative to the anchor 32. When the contact 160 engages the end 152, the second electrical circuit is completed to send a signal to the controller 44 that a second predetermined amount of tension is being applied to the seat belt 12.

When the tongue 24 is inserted into the buckle 30, tension is applied to the seat belt webbing 12. The buckle 30 moves upward relative to the anchor 32 and the floating member 90, as viewed in FIG. 5. If the amount of tension being applied to the seat belt 12 is less than the first predetermined amount, the buckle 30 moves upward relative to the floating member 90 a distance less than the first distance. The end 152 of the arm 150 does not engage the contact 158. A signal indicating that little or no tension is being applied to the seat belt 12 is sent to the controller 44.

If the amount of tension in the seat belt 12 is equal to or greater than thee first predetermined amount and less than the second predetermined amount, the buckle 30 moves upward relative to the floating member 90 a distance equal to or greater than the first distance and less than the second distance. The end 152 of the arm 150 engages the contact 158 when the buckle 130 moves relative to the floating member 90 through the first distance. The first electrical circuit is completed when the end 152 engages the contact 158, and a signal indicating that the first predetermined amount of tension is being applied to the seat belt 12 is sent to the controller 44.

If the amount of tension in the seat belt 12 is equal to or greater than the second predetermined amount, the buckle 30 moves upward relative to the floating member 90 a distance equal to the second distance. The end 152 of the arm 150 engages the contact 160. The second electrical circuit is completed, and a signal indicating that the second predetermined amount of tension is being applied to the seat belt 12 is sent to the controller 44. Accordingly, a signal is sent to the controller 44 in a step manner.

A fifth embodiment of a seat belt tension sensor for use in the occupant restraint system 10 of FIG. 1 is illustrated in FIG. 7. Since the embodiment of the seat belt tension sensor illustrated in FIG. 7 is generally similar to the embodiment of the seat belt tension sensor illustrated in FIGS. 2–3, similar numerals will be utilized to designate similar components.

A member 170 is connected to a frame 72 of a belt buckle 30 by pins 172. The member 170 has an opening 174 through which webbing 82 of an anchor 32 extends. The member 170 includes a cross piece 176 which partially defines the opening 174.

A U-shaped leaf spring 180 includes ends 182 engaging a cross piece 94 of a floating member 90. The ends 182 of the spring 180 slide in opposite directions along the cross piece 94 as the buckle 30 moves relative to the anchor 32. A curved portion 184 of the spring 180 extends between the ends 182. The curved portion 184 engages an inductive pressure sensor 186 connected to the cross piece 176 of the member 170. The spring 180 biases the member 170 and, therefore, the belt buckle 30 in a downward direction relative to the floating member 90 and the anchor 32 into an initial position, as shown in FIG. 7.

When the tongue 24 is inserted into the buckle 30, tension is applied to the webbing 12. The buckle 30 moves upward relative to the anchor 32 and the floating member 90. As the member 170 and the belt buckle 30 move upward, the spring 180 is compressed or flattened and the ends 182 of the spring slide in opposite directions along the cross piece 94. As the spring 180 is compressed, the pressure applied to the pressure sensor 186 increases. The pressure sensor 186 sends a continuous signal to the controller 44 to indicate the amount of tension in the seat belt webbing 12.

A sixth embodiment of a seat belt tension sensor for use in the occupant restraint system 10 of FIG. 1 is illustrated in FIG. 8. Since the embodiment of the seat belt tension sensor illustrated in FIG. 8 is generally similar to the embodiment of the seat belt tension sensor illustrated in FIGS. 2–3, similar numerals will be utilized to designate similar components.

A U-shaped member 196 is connected with a frame 72 of a belt buckle 30. The U-shaped member 196 has a pair of parallel arms 198. A cross piece 200 extends between the arms 198 and is connected to the frame 72.

An anchor 32 comprises a member 202, such as a metal strap, having an opening 204. The member 202 projects into the space between the arms 198. A floating member 206 is located within the opening 204.

The floating member 206 is connected to the arms 198 of the member 196 by pins 210, one of which is shown in FIG. 8. The pins 210 extend through the floating member 206 and the arms 198 of the member 196. Accordingly, the floating member 206 moves with the buckle 30 relative to the anchor 32.

A spring 212 extends between an upper portion 214 of the member 202 and an upper surface of the floating member 206. Electrical contacts (not shown) are connected with the floating member 206 and/or the anchor 32 to produce signals in response to tension being applied to the seat belt webbing 12.

When the tongue 24 is inserted into the buckle 30, tension is applied to the seat belt 12. The buckle 30 and the floating member 206 move upward relative to the anchor 32. As the floating member 206 moves upward, signals are sent to the controller 44 to determine the amount of tension in the seat belt 12.

From the above description of the invention, those skilled in the art will perceive improvements, changes and modifications. For example, it is contemplated that conical or belville springs could be used instead of the springs described. It is also contemplated that potentiometers, variable resistors, or non-contact Hall sensors could be used instead of the switches described. Furthermore, it is contemplated that the tension sensors could be used in any mounting arrangement known in the art, such as, a metal strap mounting, a webbing mounting, or a cable mounting. It is also contemplated that the tension sensor could be part of the retractor or any other component of the occupant restraint system, such as, the anchorage or in line on the webbing. Such improvements, changes and modifications within the skill of the art are intended to be covered by the appended claims.

Having described the invention, the following is claimed:

1. Apparatus comprising:

seat belt webbing for restraining an object in a vehicle seat of a vehicle;

a tongue connected to said seat belt webbing;

a buckle which receives and latches said tongue;

an anchor which connects said buckle to the vehicle, tension in said seat belt webbing acting on said buckle and said anchor, said buckle moving relative to said anchor as tension in said seat belt webbing increases;

a sensor associated with the vehicle seat for sensing a sensed weight of the object in the vehicle seat;

a seat belt tension sensor for sensing the tension in said seat belt webbing, said tension sensor comprising means for sensing the movement of said buckle relative to said anchor; and a controller for determining a computed weight of the object as a function of both the sensed weight and the tension in said seat belt webbing.

2. Apparatus as defined in claim 1 wherein said sensed weight is greater than the actual weight of the object and differs from the actual weight of the object by a first amount, said computed weight differing from the actual weight of the object by a second amount which is less than said first amount.

3. Apparatus as defined in claim 1 wherein said controller stores a plurality of empirical sensed weight values, a plurality of seat belt tension values, and a plurality of computed weight values, each of said computed weight values corresponding to a set of combinations of said empirical sensed weight values and said seat belt tension values.

4. Apparatus as set forth in claim 1 wherein said tension sensor comprises a floating member connected with one of said buckle and said anchor, and a spring interposed between said floating member and said one of said buckle and said anchor and resisting movement of said buckle relative to said anchor, and means for providing an electrical signal in response to movement of said buckle relative to said anchor.

5. Apparatus as defined in claim 4 wherein said means for providing an electrical signal comprises first and second electrical circuits, said first electrical circuit being complete when a first set of electrical contacts join and said second electric circuit being complete when a second set of electrical contacts join.

6. Apparatus as defined in claim 1 wherein said tension sensor comprises a member attached to said buckle and movable with said buckle relative to said anchor, said member being interposed between said buckle and said anchor, and a spring acting to hold said member and said anchor in spaced relation.

7. Apparatus as defined in claim 6 wherein movement of said buckle relative to said anchor due to an increase in tension in said belt webbing compresses said spring, and further including means for providing an electrical signal indicative of the tension in said seat belt webbing in response to movement of said buckle relative to said anchor.

8. Apparatus as defined in claim 1 further including an inflator for inflating an inflatable vehicle occupant protection device, said controller controlling an amount of inflation fluid flowing from said inflator into said inflatable occupant protection device as a function of both the sensed weight and the tension in said seat belt webbing.

9. Apparatus as defined in claim 8 wherein said controller prevents inflation fluid from flowing into said inflatable occupant protection device when said computed weight is below a predetermined value.

10. Apparatus as defined in claim 8 wherein said controller causes a minimal amount of inflation fluid to be directed into said inflatable occupant protection device when said computed weight is below a predetermined value.

11. Apparatus as defined in claim 1 wherein said sensing means includes a first switch and a second switch.

12. Apparatus as defined in claim 11 wherein said first switch is normally in a first condition and is actuated to a second condition upon movement of said buckle relative to said anchor by a first predetermined distance, actuation of said first switch to said second condition indicating tension in said seat belt webbing of a first predetermined amount.

13. Apparatus as defined in claim 12 wherein said first switch includes a first electrical contact disposed on said buckle and a second electrical contact disposed on said anchor.

14. Apparatus as defined in claim 12 wherein said second switch is normally in a first condition and is actuated to a second condition upon movement of said buckle relative to said anchor by a second predetermined distance, actuation of said second switch to said second condition indicating tension in said seat belt webbing of a second predetermined amount.

15. Apparatus as defined in claim 11 wherein said first switch includes a first electrical contact disposed on said buckle and a second electrical contact disposed on said anchor, said second switch including a third electrical contact disposed on said buckle and said second electrical contact disposed on said anchor.

* * * * *